United States Patent [19]

Grigo et al.

[11] 4,210,579

[45] Jul. 1, 1980

[54] THERMOPLASTIC MIXTURES OF POLYPROPYLENE WITH ETHYLENE/VINYL ACETATE AND ETHYLENE/PROPYLENE COPOLYMERS

[75] Inventors: Ulrich Grigo, Krefeld; Josef Merten, Korschenbroich; Rudolf Binsack; Erhard Tresper, both of Krefeld, all of Fed. Rep. of Germany

[73] Assignee: Bayer Aktiengesellschaft, Fed. Rep. of Germany

[21] Appl. No.: 19,448

[22] Filed: Mar. 12, 1979

[30] Foreign Application Priority Data

Mar. 16, 1978 [DE] Fed. Rep. of Germany ....... 2811548

[51] Int. Cl.$^2$ ................... C08L 23/16; C08L 53/00; C08L 45/00
[52] U.S. Cl. ................................ 525/88; 525/97; 525/211; 525/232
[58] Field of Search .................... 260/897 B, 876 B

[56] References Cited

U.S. PATENT DOCUMENTS

| | | |
|---|---|---|
| 3,361,852 | 1/1968 | Bassett et al. . |
| 3,941,859 | 3/1976 | Batiuk et al. ................... 260/897 B |

*Primary Examiner*—Carman J. Seccuro
*Attorney, Agent, or Firm*—Connolly and Hutz

[57] ABSTRACT

A thermoplastic mixture comprising (A) from 2 to 40% by weight of a partially crystalline ethylene/propylene copolymer or terpolymer having an ethylene content of from 70 to 90% by weight and an endothermic heat of fusion of from 6 to 18 cal/g, (B) from 30 to 93% by weight of a crystalline polypropylene, and (C) from 5 to 30% by weight of a copolymer of ethylene and vinyl acetate containing from 20 to 70% by weight of vinyl acetate, the percentages being based on the sum of (A)+(B)+(C).

6 Claims, No Drawings

THERMOPLASTIC MIXTURES OF POLYPROPYLENE WITH ETHYLENE/VINYL ACETATE AND ETHYLENE/PROPYLENE COPOLYMERS

This invention relates to thermoplastic mixtures of a partially crystalline ethylene/propylene copolymer or terpolymer, a crystalline polypropylene and a copolymer of ethylene and vinyl acetate.

Polymer mixtures of ethylene/propylene copolymer (EPM) or ethylene/propylene terpolymer (EPDM) and polypropylene are known (German Auslegeschrift No. 2,340,202 and German Offenlegungsschrifts Nos. 2,640,850; 2,641,518 and 2,644,644). Mixtures of polypropylene and unvulcanised EP(D)M are described in those Applications. The use of vulcanising or crosslinking agents in these mixtures is described in German Auslegeschrifts Nos. 2,202,738 and 2,202,706, in German Offenlegungsschrift No. 2,632,654, In German Pat. No. 1,271,980 and in German Auslegeschrift No. 1,150,200.

U.S. Pat. No. 3,361,852 describes a ternary polymer mixture consisting of polypropylene, an amorphous ethylene/propylene copolymer containing from 5 to 75% by weight of ethylene and a copolymer of ethylene with vinyl acetate. Japanese Patent No. 51 145-553 describes a mixture of polypropylene, ethylene/propylene copolymer and ethylene/vinyl acetate copolymer which is crosslinked during processing (gel content in tetralin at 135° C.: 30–80%).

Although tertiary mixtures of polypropylene, ethylene/vinyl acetate copolymer and statistical amorphous EPM or EPDM shown high elasticity, they are attended by the disadvantage of a distinct reduction in dimensional stability under heat (Vicat temperature) and hardness (U.S. Pat. No. 3,361,852). By contrast, the ternary mixtures according to the invention are distinguished by the fact that they show a considerable improvement in dimensional stability under heat and hardness without any reduction in elasticity, particularly permanent elongation.

Although binary mixtures of polypropylene and partially crystalline sequential EPM or EPDM are distinguished by extreme hardness and high dimensional stability under heat, they are attended by the disadvantage of poor elasticity and, above all, low permanent elongation. The ternary mixtures according to the invention have the advantage over binary mixtures with sequential EPM or EPDM that they bring about a distinct improvement in elastic properties, particularly permanent elongation. Although binary mixtures of polypropylene and statistical amorphous EPM or EPDM show high elasticity, hardness and dimensional stability under heat are distinctly reduced by comparison with the mixtures according to the invention.

It has been found that thermoplastic mixtures having the advantages described above are obtained by using partially crystalline ethylene/propylene or ethylene/propylene/diene copolymers. According to the invention ethylene/propylene or ethylene/propylene/diene copolymers having an ethylene content of approximately 70 yo 90% by weight and containing so called ethylene sequencies (G. Kerrutt, Kautsschuk u. Gummi, Kunststoffe 26, 341 (1973)) are used for this purpose. The sequential EPM or EPDM used in accordance with the invention has a heat of fusion of from 6 to 18 cal/g and preferably from 8 to 15 cal/g. It has a solidification temperature (Tg) of from −30° to −45° C., a melting temperature of from 40° to 60° C. and a Mooney viscosity of generally from 20 to 90 (ML$_{1-4}$, 100° C.). In addition, the sequential EPM and EPDM are distinguished by a high crude strength and by a very low gel content (>5%).

The present invention provides thermoplastic mixtures consisting of:
(A) from 2 to 40% by weight of a partially crystalline ethylene/propylene copolymer or terpolymer having an ethylene content of from 70 to 90% by weight and an andothermic heat of fusion of from 6 to 18 cal/g,
(B) from 30 to 93% by weight of a crystalline polypropylene, and
(C) from 5 to 30% by weight of a copolymer of ethylene and vinyl acetate.

The ethylene/propylene copolymers used in accordance with the invention contain from 0 to 2 double bonds per 1000 carbon atoms, whilst the ethylene/propylene/diene terpolymers may contain from 2 to 20 double bonds per 1000 carbon atoms. The ethylene makes up from about 70 to 90% by weight of the polymer, the propylene from about 10 to 30% by weight and the diene from 0.2 to 10% by weight, based in each case on the total weight of the EPDM polymer. The ethylene content is preferably from about 75 to 85% by weight, the propylene content from about 10 to 25% by weight and the diene content from 0.5 to 8% by weight. Examples of suitable dienes are conjugated dienes, for example isoprene and butadiene, and unconjugated dienes containing from 5 to 25 carbon atoms, for example 1,4-pentadiene, 1,4-hexadiene, 1,5-hexadiene, 2,5-dimethyl-1,5-hexadiene and 1,4-octadiene; cyclic dienes, for example cyclopentadiene, cyclohexadiene, cyclooctadiene and dicyclopentadiene; alkenyl norbornenes, for example 5-ethylidene-2-norbornene, 5-butylidene-2-norbornene, 2-methallyl-5-norbornene, 2-isopropenyl-5-norbornene and tricyclodienes, for example 3-methyl tricyclo-(5.2, 1.0, 2.6)-3,8-decadiene. Preferred dienes are ethylidene norbornene or dicyclopentadiene.

The EPM or EPDM copolymers may be obtained by known methods, for example by polymerisation in suspension or solution.

The polypropylene used has a density of from about 0.90 to 0.92 g/cc and a melt index (IMI) of from 5 to 20 g/10 mins, as measured at 230° C. under a load of 2.16 kg. Polypropylenes having melt indices of from 5 to 15 g/10 mins are preferred. The polypropylene used in accordance with the invention should have an isotactic content of more than 90% because otherwise significant reductions in dimensional stability under heat (Vicat VST/A) and ball indentation hardness can occur. The isotactic content may be determined for example by NMR spectroscopy on a solution of the polypropylene in trichlorobenzene. The polypropylenes are commercially available and may be produced by known polymerisation processes.

The ethylene/vinyl acetate copolymers used have a Mooney viscosity of from 10 to 50 (ML$_{4+1}$, 100° C.), a density of from 0.93 to 1.2 g/cc and a gel content of >5% (as determined in toluene). The copolymer has a vinyl acetate content of from 20 to 70% by weight, preferably from 25 to 60% by weight and, with particular preference, from 30 to 50% by weight. The vinyl acetate units in the copolymer are in general statistically distributed. The heat of fusion of the copolymers should amount to less than 15 cal/g (Table 1).

The products according to the invention are physical mixtures of EPM or EPDM copolymer, isotactic polypropylene and ethylene-vinyl acetate copolymer. They are produced by physically mixing the three copolymer components under the action of heat and shear forces. No vulcanising or crosslinking agents are used.

The polymer mixtures according to the invention may be thermoplastically processed at temperatures above 130° C. and preferably at temperatures in the range of from 130° to about 210° C. and may be reprocessed without significant degradation. In spite of this, the polymer mixtures are flexible and elastic at room temperature. The polymer mixtures may readily be processed by the usual methods, for example in two-roll mixers, extruders and Banbury mixers using standard mixing and addition techniques.

Examples of suitable additives for the polymer mixtures are oxides of zinc, calcium and magnesium; fatty acids, for example stearic acid and lauric acid, and their salts, for example zinc and copper stearate; fillers, for example carbon blacks or talcum, calcium and magnesium carbonate, calcium and barium sulphate, aluminium silicate and asbestos; plasticisers and extenders, for example organic diesters, such as diisobutyl, diisooctyl, diisodecyl and dibenzyl oleate, stearate, sebacate, azelate and phthalate; aromatic naphthenic and paraffinic oils; antioxidants, antiozonants and light stabilisers, for example sterically hindered phenols such as 2,6-di-tert.-butyl-p-cresol or tetratris-[methylene-3-(3',5'-di-tert.-butyl-4'-hydroxyphenyl)-propionate]-methane, sterically hindered amines such as 2,2,6,6-tetramethyl piperidine or 2,2,6,6-tetramethyl-4-hydroxy piperidine-4-phosphonic acid; derivatives of phosphorous acid, such as tris-nonyl phosphite; amines, such as di-β-naphthyl-p-phenylene diamine, phenyl-β-naphthylamine; distearyl thiodipropionate and dilauryl thiodipropionate. Combinations of these stabilisers have also proved to be effective. Other suitable additives include pigments, tackifiers, flameproofing agents and fungicides.

The constituents are used in the quantities known and commonly encountered in thermoplast technology.

The thermoplastic polymer mixtures according to the invention are suitable, for example, for the production of automobile components, such as bumpers, instrument panels and internal trim, and also for insulating wires and cables and for the production of mats and mouldings.

EXAMPLES

The polymeric components of the mixtures, together with the additives optionally used, were mixed in a Banbury mixer. In every case, the kneading time was 5 minutes. The melt temperatures were between 130° and 220° C. The kneaded product was rolled out to form a sheet (roll temperature approximately 100° C.) and subsequently granulated. The granulate was injection moulded at 220° C. to form test specimens corresponding to DIN 53 504.

The ethylene/propylene ratio in the EPM or EPDM is determined by NMR spectroscopy (in trichlorobenzene), whilst the heat of fusion was determined under normal processing conditions by differential scanning calorimetry (DSC) and the melting temperature by differential thermoanalysis (DTA) at a heating rate of 20° C. per minute (see Table 1).

The composition of the Examples and Comparison Examples and the test results in regard to dimensional stability under heat, hardness and elasticity, measured as permanent elongation, are set out in Table 2.

The test results show that, although in Comparison Examples I and II, which contain polypropylene, statistical amorphous EPM and ethylene/vinyl acetate copolymer having a vinyl acetate content of 45 and 33% by weight (EVA 45 and EVA 33), elasticity (permanent elongation) is as good as in Examples 1 to 4 according to the invention, ball indentation hardness and dimensional stability under heat are distinctly reduced by comparison with the Examples according to the invention. Binary mixtures of polypropylene and partially crystalline sequential EPM (Comparison Example III) also have the disadvantage of inadequate elasticity, measured as permanent elongation, by comparison with the ternary Examples according to the invention, whilst binary mixtures with polypropylene and amorphous EPM (Comparison Example IV), although showing adequate elasticity, have inadequate hardness and dimensional stability under heat by comparison with Examples 1 to 4 according to the invention.

Table 1

Physical data of the polymers used

| Density g/cc | Mooney Visc. ML-4 (100° C.) | IMI 230° C./2.16 g/10 mins. | Ethylene content % by weight | Ter-component | Heat of fusion ΔH (cal/g) |
|---|---|---|---|---|---|
| Seq.-EPM | 0.86 | 85 | — | 77 | — | 13.4 |
| Seq.-EPDM Statist. | 0.86 | 85 | — | 77 | EN** | 10.2 |
| EPM | 0.86 | 45 | — | 48 | — | — |
| PP* | 0.91 | — | 8.2 | — | — | 22 |
| EVA 45 | 0.98 | 20 ± 4 | — | 45 | — | 1–2 |
| EVA 33 | 0.96 | 14 ± 4 | — | 33 | — | 8 |

*isotact. proportion: 96%
**EN = ethylidene norbornene

Table 2

Test Results

| Composition | Unit of measurement | Test specification DIN | Example No. 1 | 2 | 3 | 4 |
|---|---|---|---|---|---|---|
| PP | | | 60 parts | 60 parts | 60 parts | 60 parts |
| Seq.-EPM | | | 30 parts | — | 30 parts | — |
| Seq.-EPDM | | | — | 30 parts | — | 30 parts |
| Statist.-EPM | | | — | — | — | — |
| EVA 45 | | | 10 parts | 10 parts | — | — |
| EVA 33 | | | — | — | 10 parts | 10 parts |
| Ball indentation hardness H30 | mPa | 53 456 | 20.3 | 19.4 | 21.2 | 20.8 |
| Vicat temperature (VST/A) | °C. | 53 460 | 117 | 116 | 118 | 118 |
| Permanent elongation | % | * | 69.2 | 67.6 | 71.5 | 69.4 |

| Composition | Comparison Example No. I | II | III | IV |
|---|---|---|---|---|
| PP | 60 parts | 60 parts | 60 parts | 60 parts |
| Seq.-EPM | — | — | 40 parts | — |
| Seq.-EPDM | — | — | — | — |

Table 2-continued

| | Test Results | | | |
|---|---|---|---|---|
| Statist.-EPM | 30 parts | 30 parts | — | 40 parts |
| EVA 45 | 10 parts | — | — | — |
| EVA 33 | — | 10 parts | — | — |
| Ball indentation hardness $H_{30}$ | 14.4 | 15.3 | 22 | 15.0 |
| Vicat temperature (VST/A) | 109 | 111 | 119 | 112 |
| Permanent elongation* | 67.2 | 68.7 | 82.3 | 67.3 |

*determined in the tensile test according to DIN 53 455

We claim:

1. A thermoplastic mixture comprising
    (A) from 2 to 40% by weight of a partially crystalline sequential ethylene/propylene copolymer or terpolymer having an ethylene content of from 70 to 90% by weight and an endothermic heat of fusion of from 6 to 18 cal/g,
    (B) from 30 to 93% by weight of a crystalline polypropylene having an isotactic content of more than 90%, and
    (C) from 5 to 30% by weight of a copolymer of ethylene and vinyl acetate containing from 20 to 70% by weight of vinyl acetate, the percentages being based on the sum of (A)+(B)+(C).

2. A thermoplastic mixture as claimed in claim 1, comprising
    (A) from 2 to 25% by weight of the ethylene/propylene copolymer or ethylene/propylene terpolymer,
    (B) from 70 to 93% by weight of the polypropylene, and
    (C) from 5 to 28% by weight of the ethylene/vinyl acetate copolymer.

3. A thermoplastic mixture as claimed in claim 1, wherein the ethylene/propylene copolymer or terpolymer contains from 75 to 85% by weight of ethylene and has a heat of fusion of from 8 to 15 cal/g.

4. A thermoplastic mixture as claimed in claim 1, wherein the ethylene/propylene terpolymer contains from 0.2 to 10% by weight of unconjugated diene.

5. A thermoplastic mixture as claimed in claim 1, wherein the polypropylene has a melt index (IMI) of from 5 to 20 g/10 mins at 230° C. under a load of 5 kg.

6. A thermoplastic mixture as claimed in any one of claims 1 to 5, wherein the ethylene/vinyl acetate copolymer has a vinyl acetate content of from 25 to 60% by weight.